(12) United States Patent
Yoda et al.

(10) Patent No.: US 7,880,365 B2
(45) Date of Patent: *Feb. 1, 2011

(54) ACTUATOR CAPABLE OF DRIVING WITH LARGE ROTATIONAL ANGLE OR LARGE DEFLECTION ANGLE

(75) Inventors: Mitsuhiro Yoda, Shiojiri (JP); Hirokazu Ito, Okaya (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,957

(22) Filed: Dec. 3, 2009

(65) Prior Publication Data

US 2010/0079835 A1    Apr. 1, 2010

Related U.S. Application Data

(63) Continuation of application No. 11/300,158, filed on Dec. 14, 2005, now Pat. No. 7,649,301.

(30) Foreign Application Priority Data

Dec. 15, 2004    (JP)    ............... 2004-363608

(51) Int. Cl.
*H02N 1/00*    (2006.01)
(52) U.S. Cl. ............. 310/309; 359/224.1; 359/290
(58) Field of Classification Search .......... 310/309; 359/224.1, 224.2, 225.1, 290, 291
See application file for complete search history.

(56) References Cited

U.S. PATENT DOCUMENTS 5,345,521 A    9/1994    McDonald et al.

| 5,543,956 A | 8/1996 | Nakagawa et al. |
| 6,449,079 B1 | 9/2002 | Herrmann |
| 6,795,225 B2 * | 9/2004 | Tsuboi et al. ............ 359/224.1 |

(Continued)

FOREIGN PATENT DOCUMENTS

DE    197 28 598    2/1999

(Continued)

OTHER PUBLICATIONS

Kurt E. Peterson, "Silicon Torsional Scanning Mirror", IBM J. Res. Develop., vol. 24, No. 5, pp. 631-637, Sep. 1980.

(Continued)

*Primary Examiner*—Karl I Tamai
(74) *Attorney, Agent, or Firm*—Harness, Dickey & Pierce, P.L.C.

(57) ABSTRACT

An actuator 100 includes: a pair of driving portions 1, 11 spaced apart from each other; a movable portion 2 provided between the pair of driving portions 1, 11; a pair of supporting portions 3, 3 for supporting the pair of driving portions 1, 11 and the movable portion 2; a pair of first elastic connecting portions 4, 4 which respectively connect the pair of driving portions 1, 11 to the pair of supporting portions 3, 3 so that each of the driving portions 1, 11 can rotate with respect to the supporting portions 3, 3; and a pair of second elastic connecting portions 5, 5 which respectively connect the movable portion 2 to the pair of driving portions 1, 11 so that the movable portion 2 can rotate in accordance with the rotation of the pair of driving portions 1, 11.

18 Claims, 9 Drawing Sheets

U.S. PATENT DOCUMENTS

| | | | |
|---|---|---|---|
| 7,038,826 B2 | 5/2006 | Yasuda | |
| 7,123,400 B2 | 10/2006 | Murakami et al. | |
| 7,161,274 B2 | 1/2007 | Tsuboi et al. | |
| 7,271,943 B2 | 9/2007 | Yasuda et al. | |
| 7,446,911 B2 * | 11/2008 | Asai et al. | 358/481 |
| 7,649,301 B2 * | 1/2010 | Yoda et al. | 310/309 |
| 2004/0130765 A1 | 7/2004 | Gessner et al. | |
| 2004/0130767 A1 | 7/2004 | Jung et al. | |
| 2005/0116551 A1 | 6/2005 | Yoda | |
| 2005/0128552 A1 | 6/2005 | Yasuda et al. | |
| 2006/0125346 A1 | 6/2006 | Yoda | |
| 2006/0125347 A1 | 6/2006 | Yoda et al. | |
| 2006/0226734 A1 | 10/2006 | Yoda | |
| 2007/0025659 A1 * | 2/2007 | Yoda | 385/15 |
| 2010/0079835 A1 * | 4/2010 | Yoda et al. | 359/199.1 |

FOREIGN PATENT DOCUMENTS

| | | |
|---|---|---|
| EP | 1 043 716 | 10/2000 |
| JP | 06-269186 | 9/1994 |
| JP | 07-092409 | 4/1995 |
| JP | 2000-339725 | 12/2000 |
| JP | 2003-057586 | 2/2003 |
| JP | 2004-102249 | 4/2004 |
| JP | 2004-191953 | 7/2004 |
| JP | 2004-347663 | 12/2004 |
| JP | 2004-347713 | 12/2004 |
| JP | 2005-099760 | 4/2005 |
| JP | 2005-137102 | 5/2005 |
| JP | 2005-143235 | 6/2005 |
| JP | 2005-181394 | 7/2005 |

OTHER PUBLICATIONS

Kawanura Yoshio, et al., "Study of Micro Mechanics Using Si (Second Report), Effect of Atmosphere Pressure on Resonance Amplitude of Si Resonator", Central Research Laboratory, Hitachi Ltd., pp. 753-754 (and English translation thereof).

* cited by examiner

ACTUATOR CAPABLE OF DRIVING WITH LARGE ROTATIONAL ANGLE OR LARGE DEFLECTION ANGLE

CROSS-REFERENCE TO RELATED APPLICATION

This is a continuation application of U.S. Ser. No. 11/300,158 filed Dec. 14, 2005, claiming priority to Japanese Patent Application No. 2004-363608 filed Dec. 15, 2004, all of which are hereby expressly incorporated by reference.

BACKGROUND OF THE INVENTION

1. Field of the Invention

The present invention relates to an actuator, and in particular relates to an actuator of the type employing a two-degree-of-freedom vibration system.

2. Description of the Prior Art

There is known a polygon mirror (rotary polyhedron) as an actuator provided in laser printers, for example. In such a printer, in order to achieve higher-resolution and higher-quality printed output as well as higher-speed printing, it is necessary to rotate the polygon mirror at higher speed. Currently, an air bearing is used to rotate the polygon mirror at high speed with stability. However, there is a problem in that it is difficult to rotate the polygon mirror at much higher speed than the speed available at the present. Further, although a larger motor is required in order to rotate the polygon mirror at higher speed, use of such a larger motor gives rise to a problem in that it is difficult to miniaturize the size of an apparatus in which the polygon mirror is used. Furthermore, use of such a polygon mirror gives rise to another problem in that the structure of the apparatus becomes necessarily complicated, thus leading to increased manufacturing cost.

Figure 8:
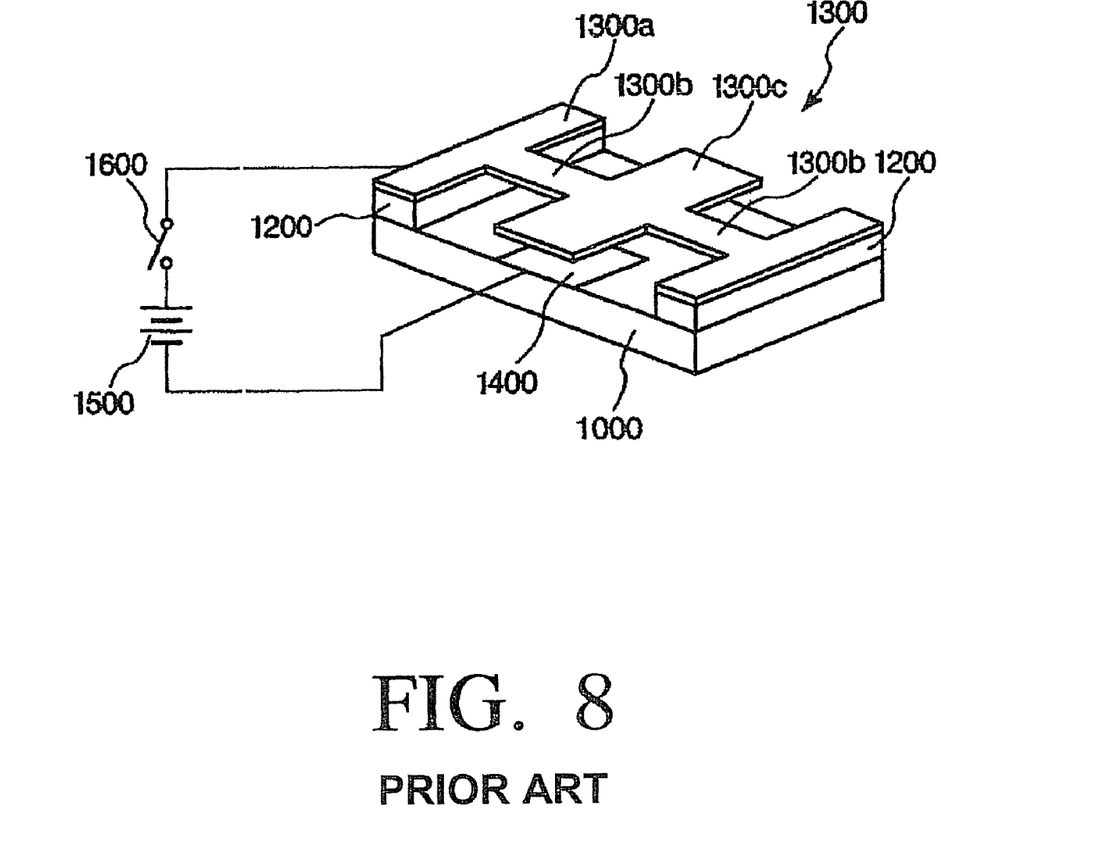
FIG. 8 is a perspective view which shows a conventional actuator.

On the other hand, a single-degree-of-freedom torsional vibrator as shown in FIG. 8 has been proposed since the early stages of research in the field of actuators. Since this vibrator uses flat electrodes which are arranged in parallel with each other, it can have quite simple structure (see K. E. Petersen: "Silicon Torsional Scanning Mirror", IBMJ. Res. Develop., Vol. 24 (1980), P. 631, for example). Further, a single-degree-of-freedom electrostatic drive type vibrator obtained by modifying the torsional vibrator described above so as to have a cantilever structure has also been proposed (see Kawamura et al.: "Research in micromechanics using Si", Proceedings of the Japan Society for Precision Engineering Autumn Conference (1986), P. 753, for example).

FIG. 8 shows such a single-degree-of-freedom electrostatic drive type torsional vibrator. In the torsional vibrator shown in FIG. 8, a movable electrode plate 1300 made of monocrystalline silicon is fixed at end fixing portions 1300a thereof to the both ends of a glass substrate 1000 through spacers 1200. The movable electrode plate 1300 includes a movable electrode portion 1300c which is supported by the end fixing portions 1300a through narrow torsion bars 1300b. Further, a fixed electrode 1400 is provided on the glass substrate 1000 so as to be opposed to the movable electrode portion 1300c through a predetermined electrode interval. Specifically, the fixed electrode 1400 is arranged in parallel with the movable electrode portion 1300c through the electrode interval therebetween. The fixed electrode 1400 is connected to the movable electrode plate 1300 via a switch 1600 and a power source 1500.

In the torsional vibrator having the structure described above, when a voltage is applied across the movable electrode portion 1300c and the fixed electrode 1400, the movable electrode portion 1300c rotates around the axis of the torsion bars 1300b due to electrostatic attraction. Since electrostatic attraction is inversely proportional to the square of an electrode interval, it is preferable for this type of electrostatic actuator to have a small electrode interval between the movable electrode portion 1300c and the fixed electrode 1400. However, in such a single-degree-of-freedom torsional vibrator described above, the movable electrode portion 1300c which serves as a movable portion is also provided with the electrode. Therefore, if the electrode interval becomes too small, a movable range (rotational angle) of the movable electrode portion 1300c is necessarily limited. On the other hand, in order to enlarge the movable range of the movable electrode portion 1300c, it is necessary to widen the electrode interval and this in turn needs a large driving voltage. Namely, such a single-degree-of-freedom torsional vibrator described above involves a problem in that it is difficult to achieve both of low-voltage driving and large displacement.

SUMMARY OF THE INVENTION

It is therefore an object of the invention to provide an actuator capable of driving with a large rotational angle or large deflection angle.

In order to achieve the object, the invention is directed to an actuator. The actuator of the invention includes:

a pair of driving portions spaced with each other;

a movable portion provided between the pair of driving portions;

a pair of supporting portions for supporting the pair of driving portions and the movable portion;

a pair of first elastic connecting portions which respectively connect the pair of driving portions to the pair of supporting portions so that each of the driving portions can rotate with respect to the supporting portions; and a pair of second elastic connecting portions which respectively connect the movable portion to the pair of driving portions so that the movable portion can rotate in accordance with the rotation of the pair of driving portions, wherein each of the pair of driving portions is rotated around a rotation central axis of the actuator by application of an alternating voltage, whereby the movable portion rotate around the rotation central axis of the actuator, and wherein the torsional rigidity of each of the first elastic connecting portions is larger than that of each of the second elastic connecting portions.

This makes it possible to enlarge a rotational angle (deflection angle) of the movable portion. In addition, since movable portion is provided between the pair of driving portions, it is possible to operate the movable portion with a larger torque.

In the actuator according to the invention, it is preferred that the second moment of area of each of the pair of first elastic connecting portions is larger than that of each of the second elastic connecting portions.

This makes it possible to enlarge a rotational angle (deflection angle) of the movable portion.

In the actuator according to the invention, it is preferred that each of the pair of first elastic connecting portions is constructed from two connecting members each spaced from the rotation central axis with a predetermined distance.

This makes it possible to enlarge a rotational angle (deflection angle) of the movable portion. In addition, it is possible to stabilize the driving (rotational operation) of the driving portion.

In the actuator according to the invention, it is preferred that each of the pair of driving portions is constructed so as to rotate around the rotation central axis by making each of the two connecting members bending deformation.

This makes it possible to enlarge a rotational angle (deflection angle) of the movable portion. In addition, it is possible to stabilize the driving (rotational operation) of the driving portion.

In the actuator according to the invention, it is preferred that each of the pair of second elastic connecting portions is coaxially provided with respect to the rotation central axis.

This makes it possible for the movable portion to rotate stably.

In the actuator according to the invention, it is preferred that each of the pair of driving portions is driven by means of Coulomb force generated by the application of the alternating voltage.

This makes it possible to enlarge a rotational angle (deflection angle) of the movable portion.

In the actuator according to the invention, it is preferred that the actuator further includes:

a counter substrate provided so as to be spaced apart from the pair of driving portions with a predetermined distance; and a plurality of electrodes respectively provided at the positions on the counter substrate corresponding to those of the pair of driving portions, wherein each of the pair of driving portions is driven by means of Coulomb force generated by applying the alternating voltage between each of the plurality of electrodes and the corresponding driving portion.

This makes it possible for the driving portion to drive stably.

In the actuator according to the invention, it is preferred that the plurality of electrodes include two pairs of electrodes, and each pair of the two pairs of electrodes is provided at the positions on the counter substrate which correspond to both ends of the corresponding driving portion in the direction substantially perpendicular to the rotation central axis.

This makes it possible for the driving portion to drive more stably.

In the actuator according to the invention, it is preferred that the counter substrate has an opening at the portion corresponding to the movable portion.

Thus, it is possible to set the rotational angle (deflection angle) of the movable portion.

In the actuator according to the invention, it is preferred that the pair of supporting portions, the movable portion, the pair of driving portions, the pair of first elastic connecting portions and the pair of second elastic connecting portions are formed by subjecting a base material to an etching process.

This makes it possible to form (obtain) the supporting portions, the movable portion, the driving portions, the first elastic connecting portions, and the second elastic connecting portions.

In the actuator according to the invention, it is preferred that the base material is formed of silicon.

This makes it possible to form such a structure having conductivity easily. In addition, it is possible to obtain the movable portion that can drive stably.

In the actuator according to the invention, it is preferred that the actuator further includes a light reflecting portion provided on the movable portion.

Although the actuator of the invention can be applied to various types of apparatuses, it is preferable that the actuator of the invention is applied to an optical scanner, for example. In such a case, it is possible to change a light path of the light emitted to the actuator provided with the light reflecting portion.

In the actuator according to the invention, it is preferred that the actuator is of the type which employs a two-degree-of-freedom vibration system, and the frequency of the alternating voltage is set so as to be substantially the same as a lower resonance frequency of resonance frequencies of the two-degree-of-freedom vibration system at which the pair of driving portions and the movable portion resonate.

Thus, it is possible to enlarge the rotational angle (deflection angle) of the movable portion while preventing the amplitude of each of the driving portions.

In the actuator according to the invention, it is preferred that at least one of the pair of first elastic connecting portions and the pair of second elastic connecting portions includes a piezoresistive element.

Thus, it is possible to detect the rotational angle and rotational frequency of the movable portion, for example. Further, it is possible to use the detected results for control of the posture of the movable portion.

BRIEF DESCRIPTION OF THE DRAWINGS

The foregoing and other objects, features and advantages of the invention will become more readily apparent from the following detailed description of preferred embodiment of the invention which proceeds with reference to the appending drawings.

DETAILED DESCRIPTION OF THE INVENTION

Hereinafter, a preferred embodiment of an actuator according to the invention will be described with reference to the appended drawings.

Figure 1:
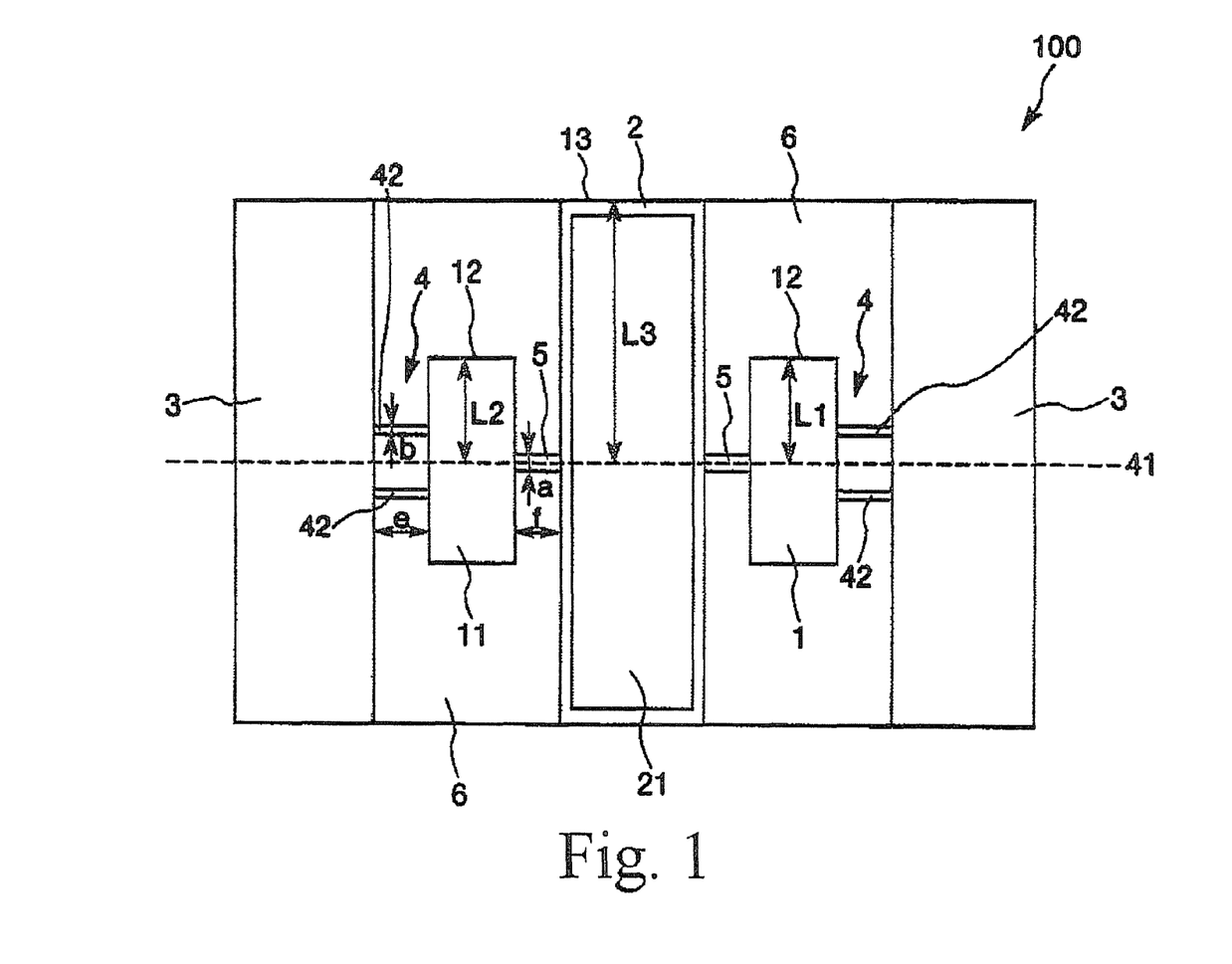
FIG. 1 is a plan view which shows an embodiment of the actuator according to the invention.
Figure 2:
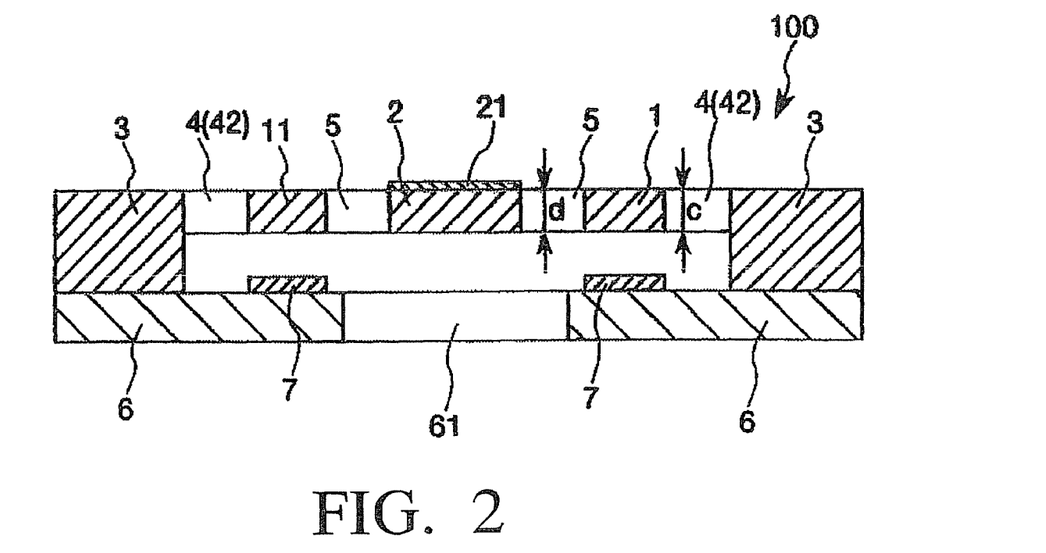
FIG. 2 is a cross-sectional view taken along line A-A in FIG. 1.
Figure 3:
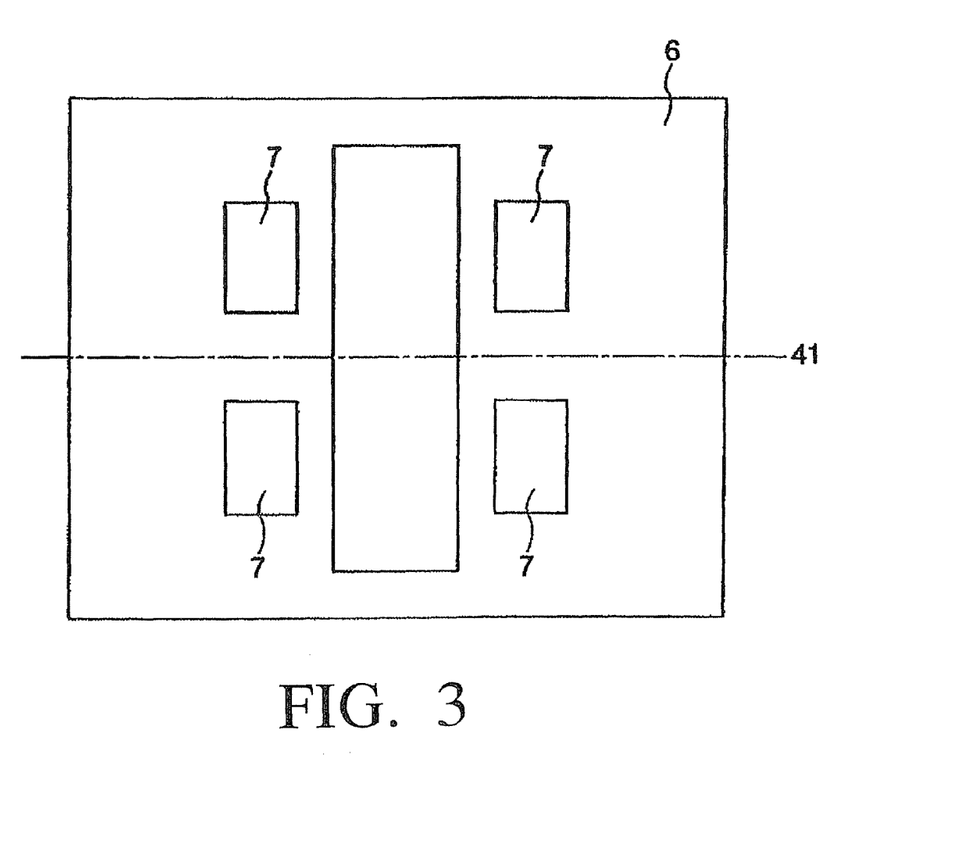
FIG. 3 is a plan view which shows the arrangement of the electrodes of the actuator shown in FIG. 1.
Figure 4A:
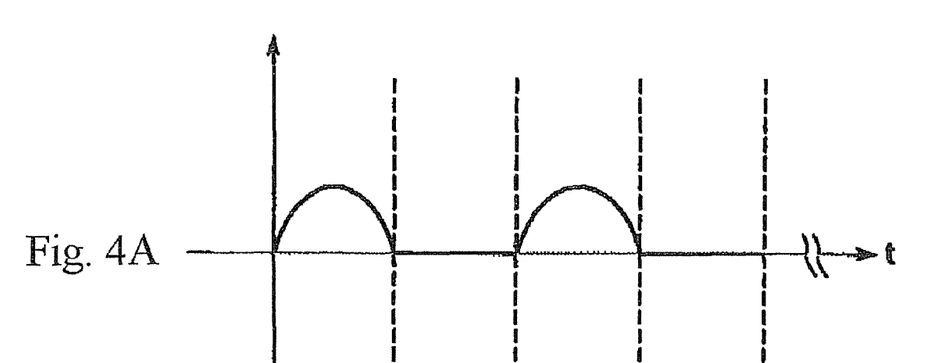
FIG. 4 is a drawing which shows an example of the alternating voltage to be applied to the actuator shown in FIG. 1.
Figure 4B:
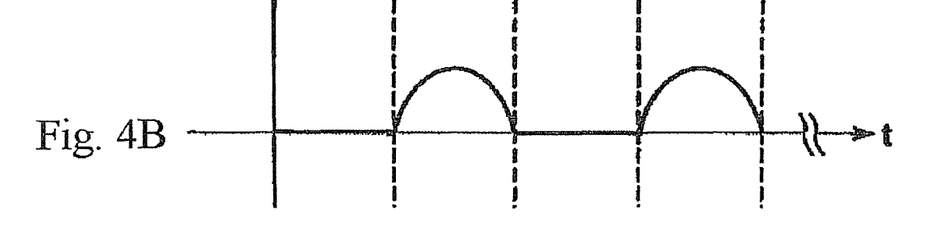
Figure 5:
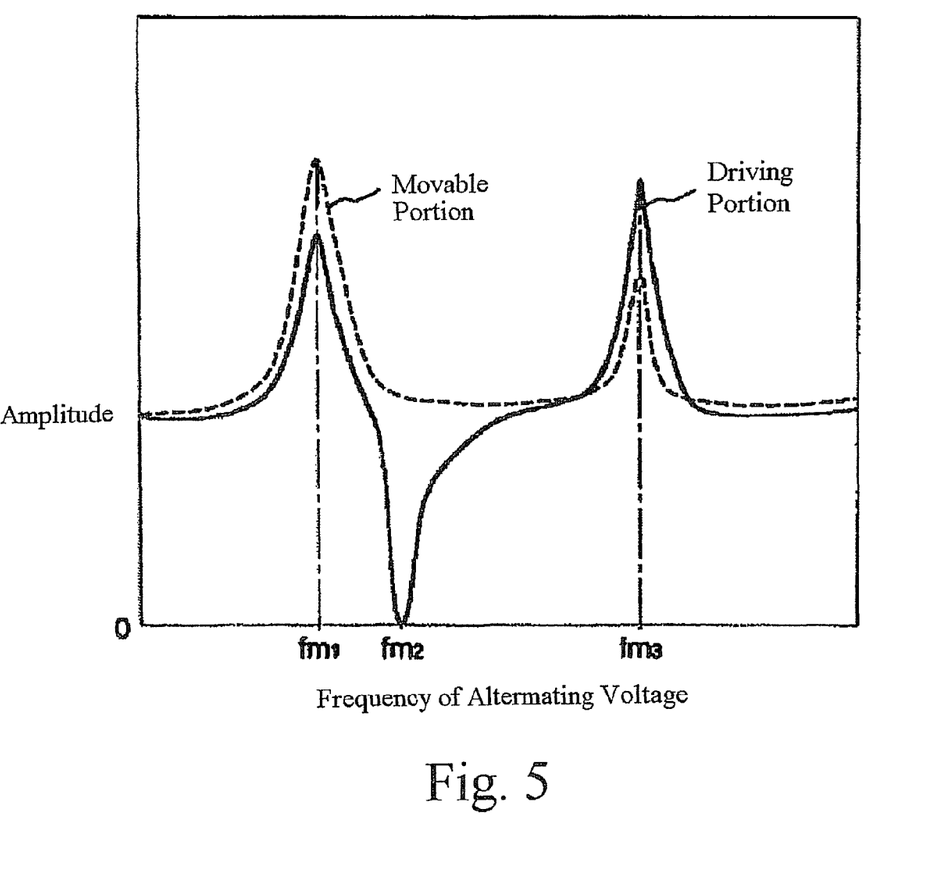
FIG. 5 is a graph which shows the frequency of an alternating voltage applied and the resonance curves of the driving portions and the movable portion.

First, an embodiment of the actuator according to the invention will be described. FIG. 1 is a plan view which shows an embodiment of the actuator according to the invention. FIG. 2 is a cross-sectional view taken along line A-A in FIG. 1. FIG. 3 is a plan view which shows the arrangement of the electrodes of the actuator shown in FIG. 1. FIG. 4 is a drawing which shows an example of the alternating voltage to be applied to the actuator shown in FIG. 1. FIG. 5 is a graph which shows the frequency of an alternating voltage applied and the resonance curves of the driving portions and the movable portion. In the following description using FIGS. 1 and 3, for convenience of description, it is to be noted that the upper side, the lower side, the right side and the left side in FIGS. 1 and 3 will be referred to as the "upper side", "lower side", "right side" and the "left side", respectively.

An actuator 100 shown in FIGS. 1 and 2 includes a pair of driving portions 1 and 11, a movable portion 2, and a pair of supporting portions 3. In the actuator 100, the movable portion 2 is positioned at the center thereof, and the driving portions 1, 11 are provided at one end side (right side in FIGS. 1 and 2) and the other side (left side in FIGS. 1 and 2) of the movable portion 2, respectively. Each of the driving portions 1, 11 and the movable portion 2 has a substantially plate shape.

Further, one supporting portion 3 is arranged at the right side of the driving portion 1 in FIGS. 1 and 2, while the other supporting portion 3 is arranged at the left side of the driving portion 11 in FIGS. 1 and 2. In the present embodiment, as shown in FIGS. 1 and 2, the driving portions 1, 11 have substantially the same shape and size as each other, and are symmetrically provided at the both ends of the movable portion 2. On the upper surface of the movable portion 2 of the present embodiment (that is, the surface of the movable portion 2 opposite to the surface that faces a counter substrate 6 which will be described later), there is provided a light reflecting portion 21.

Further, as shown in FIG. 1, the actuator 100 includes a pair of first elastic connecting portions 4, 4 and a pair of second elastic connecting portions 5, 5. The pair of first elastic connecting portions 4, 4 connect the driving portions 1, 11 to the supporting portions 3, 3, respectively, so that each of the driving portions 1, 11 can rotate with respect to the corresponding supporting portion 3. The pair of second elastic connecting portions 5, 5 connect the movable portion 2 to the driving portions 1, 11, respectively, so that the movable portion 2 can rotate in accordance with the rotation of the driving portions 1, 11.

In other words, the movable portion 2 is connected to the driving portions 1, 11 via the second elastic connecting portions 5, 5, respectively, and the driving portions 1, 11 are connected to the supporting portions 3, 3 via the first elastic connecting portions 4, 4, respectively. In this regard, the pair of second elastic connecting portions 5, 5 has substantially the same shape and size as each other. In this case, the rotation central axis of each of the first elastic connecting portions 4, 4 and the rotation central axis of each of the second elastic connecting portions 5, 5 are coaxially provided to constitute a central axis for the rotation of the driving portions 1, 11 and the movable portion 2 (that is, rotational axis) 41.

Each of the first elastic connecting portions 4, 4 is constructed from two connecting members 42, 42 each spaced from the rotation central axis 41 at even intervals (with a predetermined distance). The two connecting members 42, 42 have substantially the same shape and size as each other, and each of the connecting members 42, 42 is deformed so as to be mainly bent when the driving portions 1, 11 are driven.

Further, as shown in FIG. 1, in the case where the width of each of the second elastic connecting portions 5, 5 (the length between both ends of each of the second elastic connecting portions 5, 5 in a direction substantially perpendicular to the rotation central axis 41) is defined as a and the width of each of the two connecting members 42, 42 in the same direction is defined as b, then the widths thereof are formed so that a and b are substantially the same as each other.

Moreover, as shown in FIG. 2, in the case where the thickness of each of the first elastic connecting portions 4, 4 (the length thereof in the up-and-down direction) is defined as c and the thickness of each of the second elastic connecting portions 5, 5 in the same direction is defined as d, then the thicknesses thereof are formed so that c and d are substantially the same as each other.

Furthermore, in the case where the length of each of the connecting members 42 in the right-and-left direction in FIG. 1 is defined as e and the length of each of the second elastic connecting portions 5, 5 in the same direction is defined as f, then the lengths thereof are formed so that e and f are substantially the same as each other.

The driving portions 1, 11, the movable portion 2, the supporting portions 3, 3, the first elastic connecting portions 4, 4, and the second elastic connecting portions 5, 5 are formed of, for example, silicon as a main material as will be described later, and it is preferable that they are formed as one unit.

Further, as shown in FIG. 2, the actuator 100 of the present embodiment includes the counter substrate 6. The counter substrate 6 is provided so as to be opposed to the driving portions 1, 11 and the movable portion 2. The counter substrate 6 is formed of various glass materials or silicon as a main material, for example, and is connected (supported) to the supporting portions 3, 3.

In the counter substrate 6, as shown in FIGS. 2 and 3, an opening 61 is formed at a position corresponding to the position of the movable portion 2. The opening 61 functions as an escape portion (or relief portion) for preventing the counter substrate 6 from being contact with the movable portion 2 when the movable portion 2 rotates. By providing the opening (escape portion) 61, it is possible to set the deflection angle (amplitude) of the movable portion 2 to larger while preventing the whole actuator 100 from being made larger.

In this regard, the escape portion does not need to be an opening that opens at the lower surface of the counter substrate 6 (that is, the surface opposite to the movable portion 2) as long as it has a configuration by which it is possible to achieve the effect described above efficiently. For example, the escape portion may be constituted from a concave portion formed on the upper surface of the counter substrate 6.

Further, in the present embodiment, as shown in FIGS. 2 and 3, on the upper surface of the counter substrate 6 (that is, the surface that faces the driving portions 1, 11), there are provided two pairs of electrodes 7 at the positions corresponding to the positions of both end portions of the driving portions 1, 11, respectively. The two pairs of electrodes 7 are provided so that two electrodes 7 in each pair of electrodes 7 become substantially symmetrical to each other with respect to the surface that includes the rotation central axis 41 (that is, the rotational axis of the driving portions 1, 11) and is perpendicular to the counter substrate 6.

The two pairs of electrodes 7 are respectively connected to the driving portions 1, 11 via a power source (not shown in the drawings) so that an alternating voltage (driving voltage) can be applied across the driving portions 1, 11 and the two pairs of electrodes 7. In this regard, insulating films (not shown in the drawings) are respectively provided on the surfaces of the driving portions 1, 11 (that is, the surfaces of the driving portions 1, 11 facing the electrodes 7). This makes it possible to prevent a short circuit from occurring between the driving portions 1, 11 and each of the electrodes 7.

The actuator 100 having the structure as described above constitutes a two-degree-of-freedom vibration type actuator which has two vibration system in which the driving portions 1, 11 and the first elastic connecting portions 4, 4 constitute a first vibration system, and the movable portion 2 and the second elastic connecting portions 5, 5 constitute a second vibration system.

Such an actuator 100 drives as follows. Namely, when a sinusoidal wave (alternating voltage) or the like, for example, is applied between each of the driving portions 1, 11 and the corresponding electrodes 7, more specifically, for example, when the driving portions 1, 11 are connected to ground, and a voltage signal having a waveform of a single-phase half-wave rectification as shown in FIG. 4A is applied to the two electrodes 7, 7 at the upper side in FIG. 3 and a voltage signal having a waveform as shown in FIG. 4B, which is out of phase with the waveform as shown in FIG. 4A by 180 degrees, is applied to the two electrodes 7, 7 at the lower side in FIG. 3, Coulomb force (electrostatic force) is generated between the driving portions 1, 11 and the corresponding electrodes 7, 7, respectively.

The intensity of the Coulomb force varies depending on the change in the phase of the sinusoidal wave. Each of the connecting members 42, 42 is deformed so as to be mainly bent by means of the Coulomb force. Although bending stress is applied to each of the connecting members 42, 42 (bending deformation is mainly generated in each of the connecting members 42, 42 by itself), torsional deformation with respect to the rotation central axis 41 is mainly generated as the whole of the first elastic connecting portions 4, 4 (first vibration system). This makes the driving portions 1, 11 to rotate (vibrate) around the rotation central axis 41 (a central axis of the first elastic connecting portions 4, 4).

Then, along with the vibration (driving) of the driving portions 1, 11, the second elastic connecting portions 5, 5 receives such torsional deformation to be torsionally deformed mainly. The movable portion 2 connected to the driving portions 1, 11 via the second elastic connecting portions 5, 5 also rotate (vibrate) around the rotation central axis 41 (of the second elastic connecting portions 5, 5).

Next, the relation of the second moment of area between the first elastic connecting portions 4, 4 and the second elastic connecting portions 5, 5 to the torsional rigidity thereof will be explained using the first elastic connecting portion 4 and the second elastic connecting portion 5 at the right side of FIG. 1 typically.

The second moment of area between the first elastic connecting portion 4 and the second elastic connecting portion 5 (coefficient of hard-to-deform) is determined using the shape and cross-sectional area of each of the first and second elastic connecting portions 4 and 5.

By setting the shape, arrangement and size of the first elastic connecting portions 4, 4 and the second elastic connecting portions 5, 5 to those as described above, the second moment of area of the first elastic connecting portion 4 with respect to the rotation central axis 41 can be set to a predetermined value larger than that of the second elastic connecting portion 5.

On the other hand, the torsional rigidity of each of the first elastic connecting portion 4 and second elastic connecting portion 5 is expressed as the product of elastic modulus thereof and the second moment of area thereof, respectively.

By setting the shape, arrangement, size and material of the first elastic connecting portions 4, 4 and the second elastic connecting portions 5, 5 to those as described above, the torsional rigidity of the first elastic connecting portion 4 with respect to the rotation central axis 41 can be set to a predetermined value larger than that of the second elastic connecting portion 5. This makes it possible to enlarge the rotational angle (deflection angle) of the movable portion 2 while preventing the driving portion 1 from vibrating.

Further, since each of the first elastic connecting portions 4, 4 is constructed from the two connecting members 42, 42, it is possible to reduce the stress generated at the contact portion between each of the connecting members 42, 42 and each of the driving portions 1, 11 compared with the case where each of the first elastic connecting portions 4, 4 is constructed from one connecting member 42. This makes it possible to prevent the elastic deformation of each of the driving portions 1, 11 surely. Therefore, it is possible to reduce or prevent any vibration other than the torsional vibration of the driving portions 1, 11, whereby the rotational operation thereof can be carried out smoothly.

In addition, by mainly generating the bending deformation of each of the connecting members 42, 42 when driving the driving portions 1, 11, it is also possible to obtain the following effects.

(1) Since the elastic deformation of each of the driving portions 1, 11 is prevented more surely, it is possible to carry out the rotational operation of the driving portions 1, 11 more smoothly. This makes it possible to obtain an actuator 100 having very good following capability (response) of the movable portion 2 with respect to the driving of the driving portions 1, 11 and excellent vibration characteristic (behavioral property).

(2) Since the torsional rigidity of the first elastic connecting portion 4 can be enlarged further compared with the case where the torsional deformation is generated in each of the connecting members 42, 42, it is possible to enlarge the rotational angle (deflection angle) of the movable portion 2 further.

In this regard, the length (distance) between the rotation central axis 41 on the driving portion 1 and one end portion 12 of the driving portion 1 in a direction substantially perpendicular to the rotation central axis 41 is defined as L1, the length (distance) between the rotation central axis 41 on the driving portion 11 and an end portion 12 of the driving portion 11 in a direction substantially perpendicular to the rotation central axis 41 is defined as L2, and the length (distance) between the rotation central axis 41 on the movable portion 2 and an end portion 13 of the movable portion 2 in a direction substantially perpendicular to the rotation central axis 41 is defined as L3. Since the driving portions 1, 11 are provided independently of each other in the present embodiment, the driving portions 1, 11 do not interfere in the movable portion 2. Thus, it is possible to make the lengths L1 and L2 smaller regardless of the size of the movable portion 2 (that is, the length L3). This makes it possible to enlarge the rotational angle (deflection angle) of each of the driving portions 1, 11, and therefore it is possible to enlarge the rotational angle of the movable portion 2.

Further, by making the lengths L1 and L2 smaller, it is possible to make the distance between the respective driving portions 1, 11 and each of the corresponding electrodes 7 smaller. This makes it possible to enlarge the electrostatic force, and therefore it is possible to diminish the alternating voltage applied between each of the driving portions 1, 11 and each of the electrodes 7. In this regard, it is preferable that the lengths L1, L2 and L3 (that is, sizes of the driving portions 1, 11 and the movable portion 2) are set so as to satisfy the relations: L1<L3 and L2<L3.

By satisfying the relations described above, it is possible to make the lengths L1 and L2 further smaller. This makes it possible to enlarge the rotational angles of the driving portions 1, 11, and therefore it is possible to further enlarge the rotational angle (deflection angle) of the movable portion 2. In this case, it is preferable that the maximum deflection angle of the movable portion 2 is set so as to become 20° or more.

Moreover, by making the lengths L1, L2 smaller in this manner, it is possible to further reduce the distance between each of the driving portions 1, 11 and each of the corresponding electrodes 7, and therefore it is possible to further diminish the alternating voltage applied between each of the driving portions 1, 11 and each of the corresponding electrodes 7. Therefore, it is possible to realize (achieve) the low-voltage driving for the driving portions 1, 11 and the displacement (rotation) of the movable portion 2 with a large rotational angle.

For example, in the case where such an actuator 100 described above is applied to an optical scanner used in apparatuses such as laser printer, confocal scanning laser microscope, it is possible to make the apparatus smaller more easily.

In this regard, as mentioned above, although the lengths L1 and L2 are set so as to have substantially the same size in the present embodiment, it is no wonder that the length L1 may be different from the length L2.

It should be noted that such a two-degree-of-freedom vibration type actuator 100 has a frequency characteristic as shown in FIG. 5 between the amplitudes (deflection angles) of the driving portions 1, 11 and the movable portion 2 and the frequency of the applied alternating voltage. Namely, the two-degree-of-freedom vibration system constituted from the first vibration system of the driving portions 1, 11 and the first elastic connecting portions 4, 4, and the second vibration system of the movable portion 2 and the second elastic connecting portions 5, 5 has two resonance frequencies $fm_1$ (kHz) and $fm_3$ (kHz) (where, $fm_1 < fm_3$) at which the amplitudes of the driving portions 1, 11 and the movable portion 2 become large, and one antiresonance frequency $fm_2$ (kHz) at which the amplitude of the driving portions 1, 11 becomes substantially zero.

In this actuator 100, it is preferable that the frequency F of an alternating voltage to be applied between each of the driving portions 1, 11 and the corresponding electrodes 7 is set so as to be substantially the same as a lower resonance frequency of the two resonance frequencies, that is, the frequency F is set so as to be substantially the same as $fm_1$. By setting the frequency F (kHz) of the alternating voltage to be applied so as to be substantially the same as $fm_1$ (kHz), it is possible to increase the rotational angle (deflection angle) of the movable portion 2 while the vibration of the driving portions 1, 11 is suppressed. In this regard, it is to be noted that, in this specification, the fact that F (kHz) is substantially the same as $fm_1$ (kHz) means that F and $fm_1$ satisfy the relation: $(fm_1-1) \leq F \leq (fm_1+1)$.

It is preferable that the average thickness of each of the driving portion 1, 11 is in the range of 1 to 1,500 μm, and more preferably it is in the range of 10 to 300 μm. Similarly, it is preferable that the average thickness of the movable portion 2 is in the range of 1 to 1,500 μm, and more preferably it is in the range of 10 to 300 μm.

Further, it is preferable that the spring constant $k_1$ of each of the first elastic connecting portions 4, 4 is in the range of $1 \times 10^{-4}$ to $1 \times 10^4$ Nm/rad, and more preferably it is in the range of $1 \times 10^{-2}$ to $1 \times 10^3$ Nm/rad. Further more preferably it is in the range of $1 \times 10^{-1}$ to $1 \times 10^2$ Nm/rad. Similarly, it is preferable that the spring constant $k_2$ of each of the second elastic connecting portions 5, 5 is in the range of $1 \times 10^{-4}$ to $1 \times 10^4$ Nm/rad, and more preferably it is in the range of $1 \times 10^{-2}$ to $1 \times 10^3$ Nm/rad. Further more preferably it is in the range of $1 \times 10^{-1}$ to $1 \times 10^2$ Nm/rad. By setting the spring constant $k_1$ of each of the first elastic connecting portions 4, 4 and the spring constant $k_2$ of each of the second elastic connecting portions 5, 5 to predetermined values within the range given above, it is possible to further increase the rotational angle (deflection angle) of the movable portion 2 while the vibration of each of the driving portions 1, 11 is suppressed.

Moreover, it is preferable that, in the case where the spring constant of each of the first elastic connecting portions 4, 4 is defined as $k_1$, and the spring constant of each of the second elastic connecting portions 5, 5 is defined as $k_2$, then $k_1$ and $k_2$ satisfy the relation: $k_1 > k_2$. This makes it possible to further increase the rotational angle (deflection angle) of the movable portion 2 while the vibration of each of the driving portions 1, 11 is suppressed.

In this regard, the values of the torsional rigidity, the second moment of area and the spring constant $k_1$ of each of the first elastic connecting portions 4, 4 are calculated by assuming that the two connecting members 42, 42 are formed in an integrated manner.

Furthermore, it is preferred that, in the case where the moment of inertia of each of the driving portions 1, 11 is defined as $J_1$ and the moment of inertia of the movable portion 2 is defined as $J_2$, then $J_1$ and $J_2$ satisfy the relation: $J_1 \leq J_2$, and more preferably they satisfy the relation: $J_1 < J_2$. This makes it possible to further enlarge the rotational angle (deflection angle) of the movable portion 2 while the vibration of each of the driving portions 1, 11 is suppressed.

Now, the natural frequency $\omega_1$ of the first vibration system constituted from the driving portions 1, 11 and the first elastic connecting portions 4, 4 can be determined by the formula: $\omega_1 = (k_1/J_1)^{1/2}$ in the case where $J_1$ represents the moment of inertia of each of the driving portions 1, 11 and $k_1$ represents the spring constant of each of the first elastic connecting portions 4, 4. Similarly, the natural frequency $\omega_2$ of the second vibration system constituted from the movable portion 2 and the second elastic connecting portions 5, 5 can be determined by the formula: $\omega_2 = (k_2/J_2)^{1/2}$ in the case where $J_2$ represents the moment of inertia of the movable portion 2, and $k_2$ represents the spring constant of each of the second elastic connecting portions 5, 5.

Further, it is preferable that the natural frequency $\omega_1$ of the first vibration system and the natural frequency $\omega_2$ of the second vibration system determined in such a manner described above satisfy the relation: $\omega_1 > \omega_2$. This makes it possible to further increase the rotational angle (deflection angle) of the movable portion 2 while the vibration of each of the driving portions 1, 11 is suppressed.

In this regard, in the actuator 100 of the present embodiment, it is preferred that the actuator 100 has a piezoresistive element in at least one of the pair of first elastic connecting portions 4, 4 and the pair of second elastic connecting portions 5, 5 thereof. This makes it possible to detect rotational angles and rotation frequencies, for example. Further, it is also possible to utilize the detection results to control the posture of the movable portion 2.

Such an actuator 100 can be manufactured as follows, for example.

FIG. 6 is a drawing (longitudinal sectional view) for explaining a method of manufacturing the actuator 100 according to the present embodiment. In the following description using FIG. 6, for convenience of description, it is to be noted that the upper side and the lower side in FIG. 6 will be referred to as the "upper side" and "lower side", respectively.

Figure 6A:
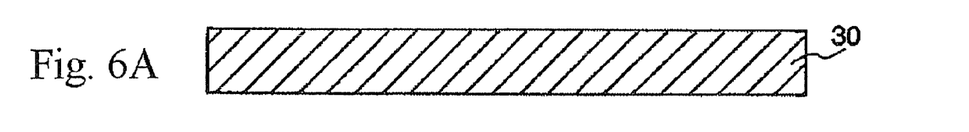
FIG. 6 is a drawing for explaining a method of manufacturing the actuator according to the present embodiment.

<A1> First, as shown in FIG. 6A, a silicon substrate (first base material) 30 is prepared.

Figure 6B:
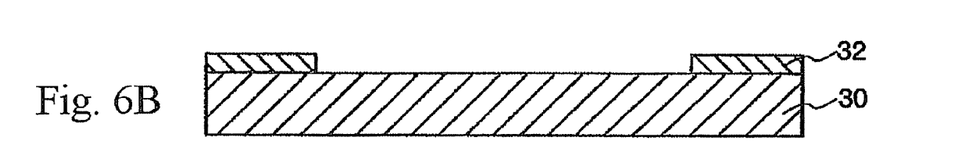

Next, photoresist is applied onto the upper surface of the silicon substrate 30, and then exposure and development are carried out for the silicon substrate 30 with the photoresist. Thus, as shown in FIG. 6B, a resist mask 23 is formed so as to correspond to the shape of the supporting portions 3, 3.

Figure 6C:
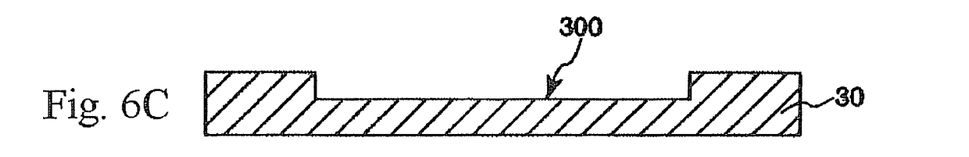

The surface of the silicon substrate 30 with the resist mask 32 is subjected to an etching process, and then the resist mask 32 is eliminated. Thus, as shown in FIG. 6C, a concave portion 300 is formed at a region other than the portions corresponding to the supporting portions 3, 3.

As for the etching method, for example, various physical etching methods such as a plasma etching method, a reactive ion etching method, a beam etching method, and a photo-assist etching method, and various chemical etching methods such as a wet etching method may be mentioned. In this case, one kind of etching method or two or more kinds of etching methods among them may be utilized.

In this regard, the similar etching method or methods can be utilized in each of the etching processes will be described later.

Figure 6D:
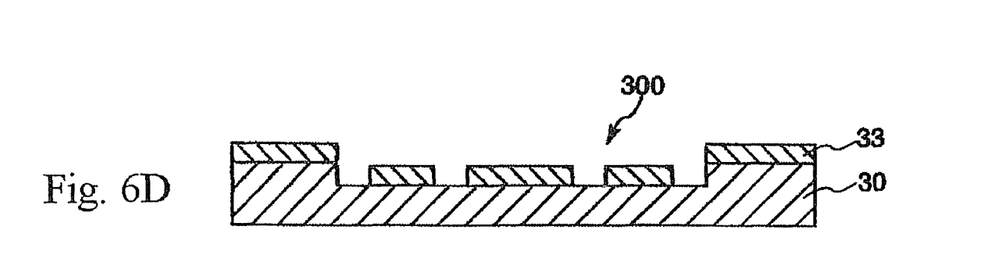

Next, photoresist is applied onto the upper surface of the silicon substrate 30 again, and exposure and development are then carried out for the silicon substrate 30 with the photoresist. Thus, as shown in FIG. 6D, a resist mask 33 is formed so as to correspond to the shape of the driving portions 1, 11, the movable portion 2, the supporting portions 3, 3, the first elastic connecting portions 4, 4 and the second elastic connecting portions 5, 5 when the silicon substrate 30 is viewed from the lower side in FIG. 2.

Figure 6E:
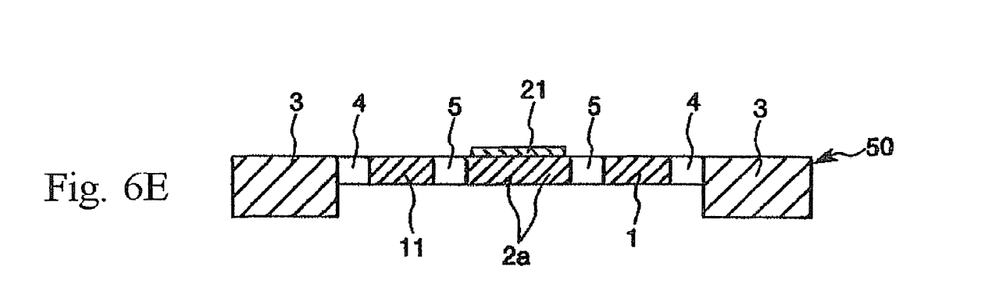

The surface of the silicon substrate 30 with the resist mask 33 is subjected to an etching process until the concave portions formed by the etching process pass through the silicon substrate 30, and then the resist mask 33 is eliminated. Thus, as shown in FIG. 6E, a structure 50 in which the driving portions 1, 11, the movable portion 2, the supporting portions 3, 3, the first elastic connecting portions 4, 4 and the second elastic connecting portions 5, 5 are formed is obtained.

A metal film is then formed on the movable portion 2 to form a light reflecting portion thereon.

As for the method of forming the metal film, various chemical vapor deposition (CVD) methods such as a plasma CVD method, a thermal CVD method, and a later CVD method, various dry plating methods such as a vacuum evaporation method, a sputtering method (a low-temperature sputtering method), and an ion plating method, various wet plating methods such as an electrolytic plating method, and an electroless plating method, a spray method, a sol-gel method, a metal organic deposition (MOD) method and joint of a metal foil may be mentioned.

In this regard, the similar method of forming the metal film can be utilized in each of the metal film forming method will be described later.

Figure 6F:
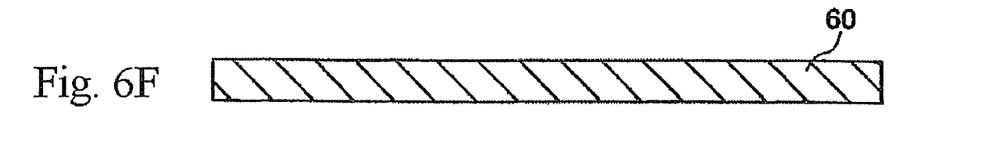

<A2> Next, as shown in FIG. 6F, a silicon substrate 60 is prepared for forming the counter substrate 6.

A metal mask made of aluminum or the like is formed on one surface of the silicon substrate 60 at the portion other than the region where an opening 61 is to be formed.

Figure 6G:
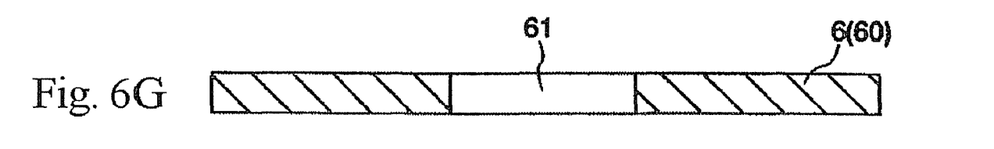

Next, the one surface of the silicon substrate 60 with the metal mask is subjected to an etching process until a concave portions formed by the etching process pass through the silicon substrate 60, and then the metal mask is eliminated. Thus, as shown in FIG. 6G, the counter substrate 6 in which the opening 61 has been formed is obtained.

Figure 6H:
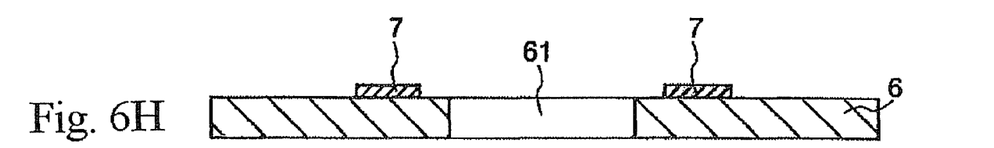

Next, as shown in FIG. 6H, four electrodes 7 are formed on the counter substrate 6. The electrodes 7 can be formed by forming a metal film and a mask corresponding to the positions of the electrodes 7 on the surface of the counter substrate 6 in which the opening 61 has been formed, and eliminating the mask after subjecting the counter substrate 6 with the mask to an etching process.

In this regard, the electrodes 7 may be formed prior to the formation of the opening 61.

Figure 6I:
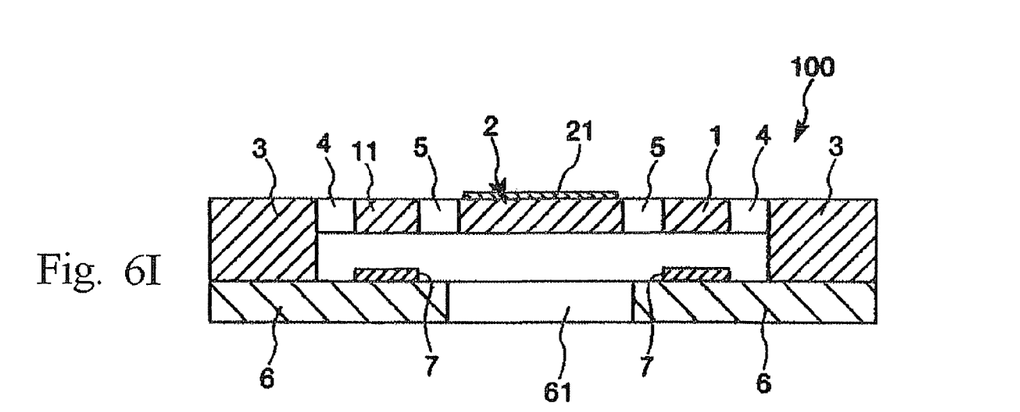
Figure 7A:
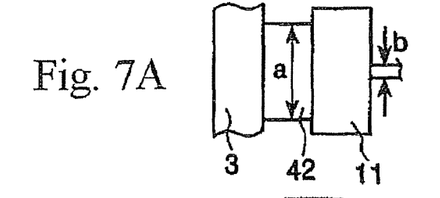
FIG. 7 is a plan view which shows an alternative example of the first elastic connecting portion.
Figure 7B:
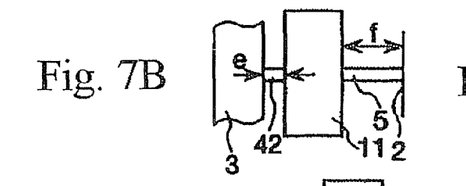
Figure 7C:
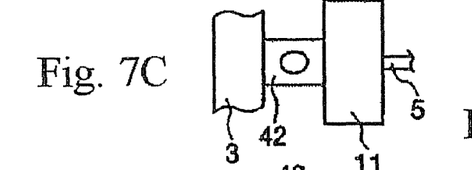
Figure 7D:
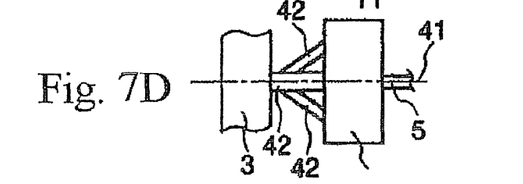
Figure 7E:
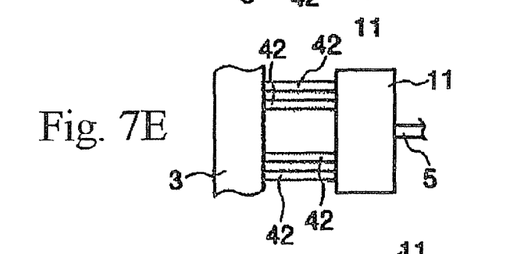
Figure 7F:
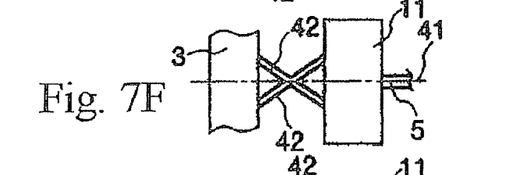
Figure 7G:
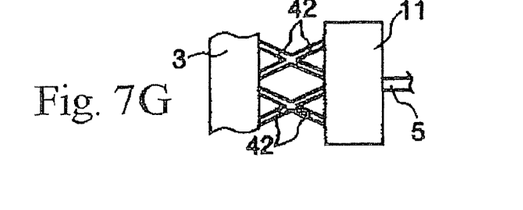
Figure 7H:
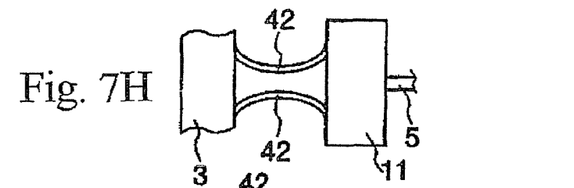
Figure 7I:
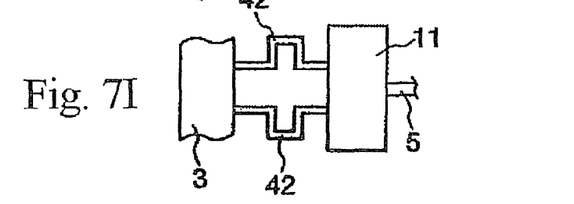
Figure 7J:
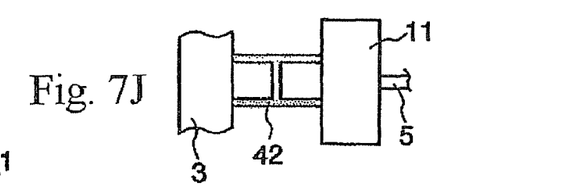

<A3> Next, as shown in FIG. 6I, the supporting portions 3, 3 of the structure 50 obtained at the step <A1> described above are bonded to the counter substrate 6 obtained at the step <A2> by means of, for example, direct bonding, anodic bonding in which a glass material containing sodium ion ($Na^+$) is used, or the like.

In the case where a glass substrate is used as a substrate for forming the counter substrate 6, in order to form the opening 61, for example, shot blast, sand blast, laser beam processing or the like can be used in addition to the etching methods as described above. Further, in this case, in order to bond the counter substrate 6 to the structure 50, anodic bonding or the like can be used, for example.

As described above, the actuator 100 of the present embodiment is manufactured.

In this regard, although, in this method of forming the actuator 100 of the present embodiment, the driving portions 1, 11, the movable portion 2, the supporting portions 3, 3, the first elastic connecting portions 4, 4 and the second elastic connecting portions 5, 5 are integrally formed by subjecting the silicon substrate 30 to the etching process from the side of the concave portion 300 thereof, the method of forming the actuator 100 is not limited thereto. For example, the driving portions 1, 11, the movable portion 2, the supporting portions 3, 3, the first elastic connecting portions 4, 4 and the second elastic connecting portions 5, 5 may be integrally formed by subjecting the silicon substrate 30 to the etching process from the side opposite to the side of the concave portion 300 thereof.

The actuators 100 described above based on the preferred embodiment can be preferably applied to optical scanners to be used in laser printers, bar-code readers, confocal scanning laser microscopes and the like, or displays for imaging, for example.

Although the actuator 100 according to the invention has been descried with reference to the embodiment shown in the drawings, the invention is not limited thereto.

Further, so long as the same or similar functions are achieved, it is possible to make various changes and additions to each portion of the actuator 100 of the invention.

Moreover, in the embodiment described above, even though it has been described that the light reflecting portion 21 is provided on one surface of the movable portion 2, in the actuator 100 according to the invention, the light reflecting portion 21 may be provided on the opposite surface of the movable portion 2, or may be provided on both surfaces of the movable portion 2, for example.

Furthermore, in the actuator 100 of the embodiment described above, even though it has been described that the electrodes 7 are provided on the counter substrate 6, in the actuator 100 according to the invention, the electrodes 7 may be provided on the driving portion 1, or may be provided on both of the counter substrate 6 and the driving portion 1, respectively.

Further, in the actuator 100 of the embodiment described above, even though it has been described that the two pairs of electrodes 7 are respectively provided at the positions corresponding to the driving portions 1, 11, the actuator 100 according to the invention is not limited thereto. For example, one or three or more electrode 7 may be provided at each of the corresponding positions.

In this regard, in the case where one electrode 7 is provided at each of the positions corresponding to the driving portions 1, 11, it is preferable that sinusoidal wave (alternating voltage) to which an offset voltage is added and in which the minimum electric potential becomes ground potential is applied to the one electrode 7, for example.

Moreover, in the actuator 100 of the embodiment described above, even though it has been described that the insulating film is provided on the surface of each of the driving portions 1, 11, which is a surface facing the electrodes 7, for preventing a short circuit from occurring, in the actuator 100 according to the invention, the insulating film may be provided on the surface of each of the electrodes 7 or may be provided on the surfaces of both of the driving portions 1, 11 and the electrodes 7, for example.

Furthermore, in the actuator 100 of the embodiment described above, even though it has been described that the pair of driving portions 1, 11 are provided, in the actuator 100 according to the invention, one driving portion may be provided so as to enclose the movable portion, for example.

Further, in the actuator 100 of the embodiment described above, the characteristic of each of the first elastic connecting portions 4, 4 may be mainly bending deformation (that is, the first elastic connecting portions 4, 4 may have a bending characteristic). For example, the first elastic connecting portions 4, 4 may have both characteristics of the bending deformation and the torsional deformation.

Moreover, so long as the torsional rigidity of the first elastic connecting portion 4 is set to a predetermined value larger than that of the second elastic connecting portion 5, the shape, arrangement, size and material of the first elastic connecting portion 4 is not limited to one shown in the drawings (one described above).

FIG. 7 is a plan view which shows an alternative example of the first elastic connecting portion. As for the structure of the first elastic connecting portion 4 in which the torsional rigidity thereof is larger than that of the second elastic portion 5, the following cases (a) to (j) may be mentioned as examples.

Namely, such cases includes: (a) the case where the width a of the connecting member 42 (first elastic connecting portion 4) is wider than the width b of the second elastic connecting portion 5; (b) the case where the length e of the connecting member 42 is shorter than the length f of the second elastic connecting portion 5; (c) the case where one or more through-hole is formed in the connecting member 42; (d) the case where two connecting members 42 are extendedly provided toward the driving portion 1 (or 11) from both side surfaces of a main connecting member 42 coaxially provided with respect to the rotation central axis 41; (e) the case where two or more connecting members 42 (two in FIG. 7E) are arranged at each of the both sides of the rotation central axis 41; (f) the case where one end of each of the connecting members 42 is positioned at the opposite side to the other end thereof with respect to the rotation central axis 41 (two connecting members 42 are provided so as to intersect with each other and the cross-point is provided on the rotation central axis 41); (g) the case where a plurality pair of connecting members 42 are formed so that a pair of connecting members 42 therein intersect with each other; (h) and (i) the case where a part or the whole of each of the connecting members 42 are curved or bent; and (j) the case where one connecting member 42 has a substantially H shape when viewed from the top of the actuator 100. In this regard, one or two or more structure among the cases (a) to (j) may be combined as the connecting members 42.

What is claimed is:

1. An actuator comprising:
    a pair of driving portions spaced apart from each other, the pair of driving portions being constituted from two independent plates;
    a movable portion provided between the pair of driving portions;
    a pair of supporting portions for supporting the pair of driving portions and the movable portion;
    a pair of first elastic connecting portions which respectively connect the pair of driving portions to the pair of supporting portions so that each of the driving portions can rotate with respect to the supporting portions, wherein each of the pair of first elastic connecting portions is constructed from two connecting members each spaced from the rotation central axis with a predetermined distance; and
    a pair of second elastic connecting portions which respectively connect the movable portion to the pair of driving portions so that the movable portion can rotate in accordance with the rotation of the pair of driving portions, wherein each of the pair of second elastic connecting portions is constructed from a connecting member coaxially provided with respect to the rotation central axis
    wherein each of the pair of driving portions rotates around a rotation central axis of the actuator by application of an alternating voltage, so the movable portion rotates around the rotation central axis of the actuator, and
    wherein the two connecting members of each of the pair of first elastic connecting portions and the connecting member of each of the pair of second elastic connecting portions have the same shape and size as each other.

2. The actuator as claimed in claim 1, wherein the second moment of area of each of the pair of first elastic connecting portions is larger than that of each of the second elastic connecting portions.

3. The actuator as claimed in claim 1, wherein each of the pair of driving portions is constructed so as to rotate around the rotation central axis by making each of the two connecting members bending deformation.

4. The actuator as claimed in claim 1, wherein each of the pair of driving portions is driven by means of Coulomb force generated by the application of the alternating voltage.

5. The actuator as claimed in claim 1, further comprising:
    a counter substrate provided so as to be spaced apart from the pair of driving portions with a predetermined distance; and
    a plurality of electrodes respectively provided at the positions on the counter substrate corresponding to those of the pair of driving portions,
    wherein each of the pair of driving portions is driven by means of Coulomb force generated by applying the alternating voltage between each of the plurality of electrodes and the corresponding driving portion.

6. The actuator as claimed in claim 5, wherein the plurality of electrodes include two pairs of electrodes, and each pair of the two pairs of electrodes is provided at the positions on the counter substrate which correspond to both ends of the corresponding driving portion in the direction substantially perpendicular to the rotation central axis.

7. The actuator as claimed in claim 5, wherein the counter substrate has an opening at the portion corresponding to the movable portion.

8. The actuator as claimed in claim 1, wherein the pair of supporting portions, the movable portion, the pair of driving portions, the pair of first elastic connecting portions and the pair of second elastic connecting portions are formed by subjecting a base material to an etching process.

9. The actuator as claimed in claim 8, wherein the base material is formed of silicon.

10. The actuator as claimed in claim 1, further comprising a light reflecting portion provided on the movable portion.

11. The actuator as claimed in claim 1, wherein the actuator is of the type which employs a two-degree-of-freedom vibration system, and the frequency of the alternating voltage is set so as to be substantially the same as a lower resonance frequency of resonance frequencies of the two-degree-of-freedom vibration system at which the pair of driving portions and the movable portion resonate.

12. The actuator as claimed in claim 1, wherein at least one of the pair of first elastic connecting portions and the pair of second elastic connecting portions includes a piezoresistive element.

13. The actuator as claimed in claim 1, wherein, when the actuator is viewed in a plan view, a length of each of the pair of driving portions in a perpendicular direction to the rotation central axis is smaller than a length of the movable portion in the perpendicular direction.

14. The actuator as claimed in claim 1, wherein the movable portion has a rectangular shape.

15. An optical scanning device provided with the actuator defined in claim 1.

16. The optical scanning device as claimed in claim 15 further comprising a laser light source.

17. A display apparatus provided with the optical scanning device defined in claim 15.

18. The display apparatus as claimed in claim 17, wherein the optical scanning device includes a laser light source,
wherein the display apparatus further comprising a display portion.

* * * * *